May 10, 1966  R. C. CLARKE  3,250,416

THERMALLY INSULATED CONTAINER

Filed May 10, 1963

INVENTOR.
ROBERT C. CLARKE
BY Ronald S. Cornell
his Attorney

United States Patent Office 3,250,416
Patented May 10, 1966

3,250,416
THERMALLY INSULATED CONTAINER
Robert C. Clarke, Excelsior, Minn., assignor to Koppers Company, Inc., a corporation of Delaware
Filed May 10, 1963, Ser. No. 279,546
5 Claims. (Cl. 215—13)

This invention relates generally to a container and more particularly to a container which possesses thermal insulating qualities.

Vacuum bottles have been used for many years to keep cold food or beverages cold and hot substances hot. The design of vacuum bottles has not changed significantly in many years. The exterior casing of the vacuum bottle holds a glass filler which contains and insulates the food. A stopper closes the glass filler which is actually a double walled bottle of thin glass. The space between the walls is evacuated to minimize heat transfer into or out of the bottle by conduction, and heat transfer by radiation is minimized by silvering the glass.

The use of these vacuum bottles has several serious disadvantages. The most grave disadvantage is that a glass vacuum bottle is a fragile device that must be handled extremely carefully. A filled bottle is almost certain to break when dropped on its side from as little as eight to twelve inches. The bottle is also susceptible to thermal shock and must be tempered before extremely hot or cold substances are placed in it.

In accordance with this invention, there is provided a low-cost, unbreakable container for the storage of hot or cold food or drinks. The novel bottle of this invention has an inner member of foam polystyrene and a low-cost material laminated to the inner member to improve the structural strength and insulating properties.

A particular advantage of my improved container resides in its extremely low production cost. This makes it possible to store hot or cold substances in the novel container and, when the contents have been consumed, the economics are such that the container can be disposed of without great monetary loss. A container of this type is particularly useful for spectators at sports events such as a football game. Coffee, for example, can be maintained at drinking temperature for the entire duration of a football game and the container can then be disposed of thereby avoiding the necessity of carrying the container to affairs after the sporting event.

Containers have been made heretofore, to take advantage of the lightweight and insulating properties of polystyrene foam. The production of articles of a foamed structure from expandable polystyrene beads, for example, such as those sold under the trade name Dylite, have been carried out by placing the expandable polymeric beads in a mold and applying heat thereto, thereby causing the beads to expand and fuse to assume the shape of the mold. The shaped thermoplastic container made in this manner has good insulating properties but these insulating properties are not adequate alone for use as a thermally insulating container, without excessive thickness of the sidewalls. Also, the cellular structure imparts a weakness to the shaped article, and whenever pressure is applied thereto, such as squeezing, the article tends to crack.

The thermal insulated container made in accordance with this invention, however, has the additional strength and insulating properties derived from the low-cost laminates applied to the outside of the container. Thus, thermally insulated containers produced in accordance with this invention have excellent rigidity and strength characteristics, and will contain liquids, such as beverages, for long periods of time without significant change in the temperature of the liquid. The containers produced by this invention also have a preferred characteristic, if desired, of a combination of two different laminated outer surfaces. Most surprisingly, the articles can also be produced, with the present market value of the materials used, at such low cost that the articles can be disposed of after a single use without substantial economic loss.

In accordance with the invention there is provided a foam polystyrene inner member which has secured thereto at least one outer layer of corrugated paper, advantageously in combination with a layer of a material such as aluminum faced paper, aluminum foil, kraft paper, extruded foam film, and the like. The outside of the foam polystyrene inner member should advantageously be corrugated so that the combination of the corrugated surface of the foam polystyrene inner member and the outer layer thereon will give an improved insulated container of extremely lightweight. The weight of a filled container will not be materially greater than the weight of the material it holds.

The above and further objects and novel features of invention will appear more full from the detailed description when the same is read in conjunction with the accompanying drawing. It is to be expressly understood, however, that the drawing is not intended to be a definition of the invention but is for the purpose of illustration only.

In the drawing wherein like parts are marked alike:

Figure 1:
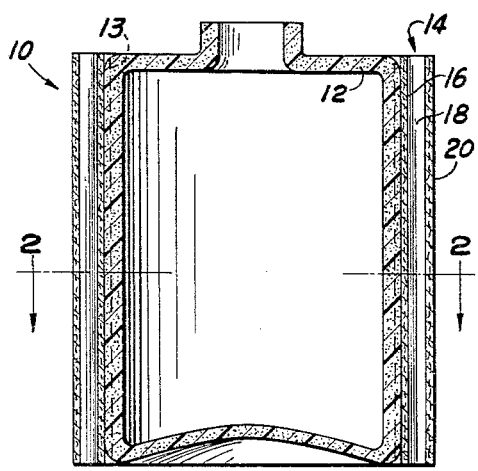
FIGURE 1 is a vertical cross-sectional view through a preferred embodiment of the container of the invention.

Referring to FIGURE 1 of the drawings, the thermal insulating container 10 consists of a container shaped inner member 12 of the foam polystyrene. The outer surface of the foam polystyrene member 12 is fluted 13 (FIGURE 2) and a double face corrugated sleeve 14 is secured to the foam polystyrene inner member 12 by a suitable means such as an adhesive.

Various conventional adhesives can be used herein. For example, a conventional starch adhesive or substantially one modified with a ureas formaldehyde or resorcinol formaldehyde resin to enhance water resistance works quite well. Ultimately, such adhesives as sodium silicate, polyvinylalkyl asbestos (molten or in an emulsion) resorcinol formaldehyde, resorcinol phenol, modified resorcinol formaldehyde resins, polystyrene latices and the like can be used. Generally speaking, elastomeric type adhesives are quite suitable.

The foam polystyrene inner member 12 may be made by any suitable method such as by blow molding or preferably by molding the member in two sections and then adhering these sections together by a suitable adhesive or by heat.

Figure 2:
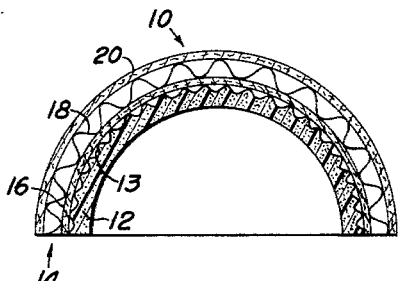
FIGURE 2 is a partial horizontal cross-sectional view taken on lines 2—2 of FIGURE 1.

The corrugated sleeve 14 is comprised of inner layer 16 and outer layer 20 of kraft paper having an intermediate corrugated center element 18. The foam polystyrene inner member 12 in combination with the corrugated sleeve 14 results in a container having excellent insulating properties, and the addition of fluting 13 adds further insulating qualities to the bottle. If desired, a single-face 32 (FIGURE 3) corrugated sleeve 34 can be substituted for the double-face sleeve 14 (FIGURE 2). In this instance the single face 32 is positioned towards the outside of the container. It is also contemplated that more than a single corrugated sleeve be used. For example, two or three layers of corrugated paper (boxboard) either single-face or double-face can be placed around the foam polystyrene inner member.

Figure 4:
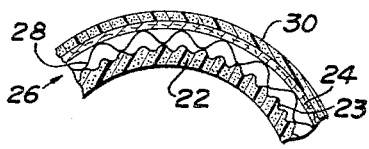
FIGURE 4 is a partial horizontal cross-sectional view of an alternate embodiment of the invention.

In the alternate embodiment shown in FIGURE 4 there is provided a foam polystyrene member 22 having a fluted 23 outer surface in combination with a single face 24 corrugated sleeve 26 having a corrugated center element 28. The outwardly disposed single-face 24 of the corrugated sleeve 26 is covered with an additional wrapping 30 which comprises a sheet of extruded foam polystyrene having a thickness of approximately 30 mils. Other materials such as aluminum foil, kraft paper, asbestos, aluminum-faced paper and the like may be substituted for the foam polystyrene extruded sheet.

Figure 5:
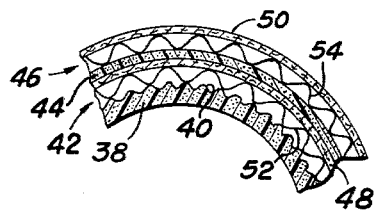
FIGURE 5 is a partial horizontal cross-sectional view of an alternate embodiment of the invention.

It is also within the contemplation of the invention to add an additional layer or layers of corrugated paper such as layer 26. These additional layers may be placed either around or under the foam polystyrene extruded sheet 30. A preferred embodiment of the invention is shown in FIGURE 5 wherein an inner member 38 of foam polystyrene is shown having a fluted outer surface 40. In combination therewith are outer layers 42, 44, 46. Layers 42 and 46 are single-face 48, 50 corrugated sleeves having corrugated sections 52, 54. The layer 44 is disposed intermediate layers 42 and 46 and comprises a sheet of extruded foam polystyrene having a thickness of about 30 mils. Other materials such as kraft paper, aluminum foil or aluminum-faced paper may be substituted for the foam polystyrene extruded sheet 44.

Figure 6:
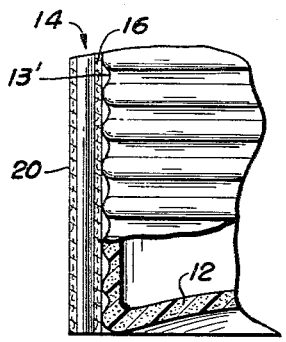
FIGURE 6 is a partially cutaway view showing a preferred embodiment of the invention.

In a preferred embodiment (FIGURE 6) of the invention the flutes 13' on the outer surface of the foam polystyrene member 12 are horizontally disposed. The flutes 13' thus form horizontal rings around the foam polystyrene member. In this way when the sleeve 14 is pulled over the container it traps air in the flutes 13' thereby forming dead air spaces for better insulation. When the flutes 13 run vertically it is possible for air to flow through the flutes.

Figure 3:
FIGURE 3 is a partial horizontal cross-sectional view of an alternate embodiment of the invention.

A series of bottles were made to determine the relative effectiveness of the various insulating materials. The bottles all had a twenty-two ounce capacity and the various bottles were made as follows:

(1) An inner member of foam polystyrene, the outer surface of which is fluted having a covering of one layer of single-face corrugated paper, the face of the corrugated layer being formed of kraft paper and the face is placed in an outward direction (FIGURE 3).

(2) The same as No. 1 above with the exception that two layers of single-face corrugated paper were used.

(3) The same as No. 2 above and, in addition, a single layer of extruded foam polystyrene film having a thickness of 30 mils was secured outside the two layers of corrugated paper.

(4) A base member of foam polystyrene with its outer side fluted having a covering of three layers of single-face corrugated paper.

(5) A base member of foam polystyrene having its outer surface fluted, having a covering of a single layer of single-face corrugated paper, and the outer surface of the corrugated paper being covered with a single layer of 30 mil extruded foam polystyrene sheet (FIGURE 4).

(6) The container of No. 5 above had an additional layer of single-face corrugated paper placed around the layer of foam polystyrene sheet (FIGURE 5).

(7) The container of No. 2 above had an additional layer of aluminum-faced paper secured around the second layer of corrugated paper.

(8) A foam polystyrene member having its outer surface fluted and secured thereto a single layer of single-face corrugated paper and a layer of aluminum-faced paper placed therearound with the aluminum side facing inwardly. The aluminum-faced paper was also folded over the bottom of the bottle.

(9) To the container of No. 1 above there was added an additional layer of asbestos (90 lb.) (FIGURE 4).

The containers described above were subjected to tests to determine the ability of the container to hold a fluid therein at a relatively high temperature. The aim of the tests was to determine how long it took for the contents of the container to drop in temperature to 140° F. which is the drinking temperature for coffee. All of the tests were run using room temperature of 72° F. and an initial temperature of the liquid in the container of between about 195–200° F.

The results are shown on the following Table I.

*Table I*

[Test run at 72°F. room temperature using hot water]

| Test No. Time (Min.) | 1 | 2 | 3 | 4 | 5 | 6 | 7 | 8 | 9 |
|---|---|---|---|---|---|---|---|---|---|
|  | °F. | °F. | °F. | °F. | °F. | °F. | °F. | °F. | °F. |
| 0 | 195 | 200 | 196 | 196 | 194 | 199 | 197 | 197 | 197 |
| 10 | 190 | 195 | 192 | 192 | 189 | 194 | 193 | 192 | 192 |
| 20 | 184 | 184 | 188 | 188 | 183 | 190 | 189 | 187 | 186 |
| 30 | 178 | 180 | 183 | 183 | 178 | 186 | 185 | 182 | 180 |
| 40 | 173 | 176 | 180 | 179 | 174 | 182 | 182 | 178 | 176 |
| 50 | 168 | 171 | 176 | 175 | 170 | 178 | 179 | 173 | 171 |
| 60 | 164 | 168 | 172 | 171 | 165 | 174 | 176 | 168 | 167 |
| 70 | 160 | 164 | 168 | 167 | 160 | 170 | 172 | 165 | 162 |
| 80 | 156 | 160 | 165 | 164 | 157 | 166 | 170 | 161 | 159 |
| 90 | 152 | 157 | 162 | 160 | 154 | 163 | 167 | 158 | 155 |
| 100 | 148 | 154 | 159 | 157 | 150 | 160 | 164 | 155 | 153 |
| 110 | 144 | 151 | 156 | 154 | 147 | 157 | 161 | 152 | 148 |
| 120 | 140 | 147 | 153 | 151 | 144 | 153 | 159 | 148 | 145 |
| 130 |  | 144 | 150 | 148 | 140 | 151 | 156 | 144 | 142 |
| 140 |  | 142 | 148 | 146 |  | 148 | 154 | 141 | 140 |
| 150 |  | 140 | 145 | 143 |  | 146 | 151 |  |  |
| 160 |  |  | 143 | 140 |  | 143 | 148 |  |  |
| 170 |  |  | 140 |  |  | 141 | 146 |  |  |
| 180 |  |  |  |  |  |  | 144 |  |  |
| 190 |  |  |  |  |  |  | 142 |  |  |
| 200 |  |  |  |  |  |  | 140 |  |  |

Table I above demonstrates that the novel container of the invention adequately maintains the temperature of a liquid for a period of time sufficient for ordinary purposes.

The invention provides a novel, inexpensive, yet efficient container for hot or cold food and drinks. The container can be produced at such low cost that it is economical to dispose of the container once it has been used instead of attempting to wash, clean and reuse it. Of course, the novel container may be reused a number of times if desired. The container is not readily breakable so no great care need be exercised in the handling of it. Also, the novel container is odorless and does not alter the flavor or odor of a food or beverage being held. The structural strength of the container is of special value, and people, especially children, in moving cars subjected to sudden starts and stops will not be able to crush the container. The novel container has those advantageous characteristics that make it especially adaptable to uses such as for dispensing liquids, e.g., malteds, cokes, etc., at takeout stands.

I claim:

1. A thermally insulated bottle comprising an inner member formed of foam polystyrene the outer surface of the sides of said inner member being fluted, and an outer member covering a substantial portion of said inner member, and comprising at least one layer of corrugated paper, such that a substantial portion of said inner member is surrounded by dead air spaces.

2. A thermally insulated bottle comprising an inner member formed of foam polystyrene, the outer surface of the sides of said inner member having a series of horizontally disposed parallel flutes forming rings around said inner member, said series extending for substantially the entire length of the sides of said inner member, and an outer member covering the fluted portion of said inner member and comprising at least one layer of corrugated paper such that dead air spaces are formed between said inner member and said outer member.

3. A thermally insulated bottle comprising an inner member formed of foam polystyrene, the outer surface of the sides of said inner member being surrounded by a series of integral, parallel, vertically disposed flutes, and an outer member covering the fluted portion of said inner member comprising at least one inner layer of corrugated paper and an outer layer of aluminum foil secured to and surrounding said inner layer and the bottom of said inner member such that a substantial portion of said inner member is surrounded by dead air spaces.

4. A thermally insulated bottle comprising an inner member formed of foam polystyrene, the outer surface of the sides of said inner member being surrounded by a series of integral, parallel, vertically disposed flutes, and an outer member covering the fluted portion of said inner member comprising at least one inner layer of corrugated paper and an outer layer of extruded foam polystyrene sheet secured to and surrounding said inner layer and the bottom of said inner member such that a substantial portion of said inner member is surrounded by dead air spaces.

5. A thermally insulated bottle comprising an inner member formed of foam polystyrene, the outer surface of the sides of said inner member being surrounded by a series of integral parallel vertically disposed flutes, and an outer member covering the fluted portion of said inner member comprising at least one inner layer of corrugated paper, an intermediate layer of extruded foam polystyrene sheet having a thickness of about 30 mils, and an outer layer of aluminum foil secured to and surrounding said inner layer and the bottom of said inner member such that a substantial portion of said inner member is surrounded by dead air spaces.

References Cited by the Examiner
UNITED STATES PATENTS

| | | | |
|---|---|---|---|
| 1,002,686 | 9/1911 | Heaton | 215—13 |
| 2,185,799 | 1/1940 | Blake et al. | 229—93 |
| 2,266,828 | 12/1941 | Sykes | 229—1.5 |
| 2,661,889 | 12/1953 | Phinney | 215—13 |
| 2,787,397 | 4/1957 | Radford | 215—1.5 |
| 2,849,144 | 8/1958 | Southwell | 215—12 |
| 2,853,222 | 9/1958 | Gallagher | 229—1.5 |
| 3,013,306 | 12/1961 | Richie et al. | 215—1.5 |
| 3,029,963 | 4/1962 | Evers | 215—1 |
| 3,141,595 | 7/1964 | Edwards | 229—1.5 |

JOSEPH R. LECLAIR, *Primary Examiner.*

FRANKLIN T. GARRETT, *Examiner.*

V. A. TOMPSON, *Assistant Examiner.*